United States Patent [19]

Mullersman

[11] 3,928,791

[45] Dec. 23, 1975

[54] STAND-BY POWER SYSTEM
[75] Inventor: Ferdinand H. Mullersman, Gainsville, Fla.
[73] Assignee: General Electric Company, Columbus, Ohio
[22] Filed: May 20, 1974
[21] Appl. No.: 471,594

[52] U.S. Cl. .......................... 320/7; 320/15; 320/18
[51] Int. Cl.² ............................................ H02J 7/00
[58] Field of Search ............................. 320/2, 5–7, 320/14–18; 307/66

[56] References Cited
UNITED STATES PATENTS
| | | | |
|---|---|---|---|
| 1,468,096 | 9/1923 | Young | 320/18 X |
| 3,114,095 | 12/1963 | Palmer | 307/66 X |
| 3,796,940 | 3/1974 | Mauch et al. | 320/44 X |

FOREIGN PATENTS OR APPLICATIONS
834,022   5/1960   United Kingdom................... 320/17

Primary Examiner—J. D. Miller
Assistant Examiner—Robert J. Hickey
Attorney, Agent, or Firm—Dennis A. Dearing; Donald J. Voss; Frank L. Neuhauser

[57] ABSTRACT

A charging system for a stand-by power supply comprising a battery having plurality of series-connected cells and a switching means for periodically and sequentially charging sections of the battery, thereby to minimize voltage variation between the normal DC power source voltage and the stand-by power supply discharge voltage applied to a load during the non-functioning of the DC power source.

11 Claims, 9 Drawing Figures

STAND-BY POWER SYSTEM

CROSS-REFERENCE TO RELATED APPLICATION

This application is related to U.S. Pat. application Ser. No. 471,593 of Leonard R. Dinkler, filed concurrently herewith, and assigned to the assignee of the invention herein.

BACKGROUND OF THE INVENTION

This invention is directed to the art including battery chargers and, more particularly, a charging system for maintaining the level of charge of a stand-by battery power system such that the voltage variation upon and after transistion between a DC bus and the stand-by power supply can be minimized.

Stand-by power systems comprised of batteries of rechargeable cells have a recurring problem in that the cells tend to self-discharge over periods of nonuse. This requires a stand-by battery power system to be recharged continuously or periodically to maintain the voltage at a predetermined level necessary for it to deliver the required power during the absence of the normal source of power. Particularly, when using a multicell, high-voltage stand-by battery power system, it has been necessary to utilize a large, expensive charger having a high voltage output.

Another problem associated with high voltage stand-by battery power systems that arises, because the systems are typically "floated" across a constant potential bus (i.e., continuously connected to a DC bus having a line voltage greater than the open-circuit voltage of the battery), is that special design considerations have been required to tolerate this charge/discharge regime. One such design consideration is the necessary inclusion of large electrolyte reserves.

A related problem to this results from the difference in magnitude between the bus voltage and the discharge voltage of a stand-by battery power supply which occurs in conventional systems. These voltages variations, which would be applied to a load upon and after transition between the bus voltage and the discharge voltage of stand-by power supply, are unacceptable for many applications. To compensate for this, it has usually been necessary to provide complex and expensive voltage-regulating equipment to permit the normal operation of the load upon transition to the stand-by power battery.

An elementary form of a stand-by battery power system for resolving the problems associated with the prior art systems is disclosed and claimed in the Dinkler application cross-referenced hereinbefore.

SUMMARY OF THE INVENTION

It is accordingly an object of this invention to provide an improved high-voltage, stand-by battery power system, thereby to avoid the problems associated with prior art systems.

Another object of this invention is to provide a high voltage stand-by battery power system with a charging apparatus permitting the use of a smaller, less expensive charger than that heretofore utilized.

Another object of the invention is to minimize the voltage variations between the bus voltage and the stand-by battery discharge voltage in a stand-by power system.

In accordance with the invention, a stand-by battery power system is provided having a plurality of cells connected in circuit, the plurality of cells being divisible into a plurality of charging sections of at least one cell each; charging means coupled to each of said sections for supplying a source of charging current to one of said sections at a time; and switching means for sequentially charging said section, one section at a time, said switching means including a plurality of circuit paths for electrically connecting said charging to said sections, current control means in said circuit paths for controlling the transmission of current therethrough, and control means for activating said current control means.

In accordance with another feature of the invention, means are provided for automatically substituting a supplemental battery section in said stand-by battery to replace a battery section which is being charged.

These and other objects of the invention will be better understood from the following description taken in conjunction with the accompanying drawings.

DESCRIPTION OF THE PREFERRED EMBODIMENTS

Figure 1:
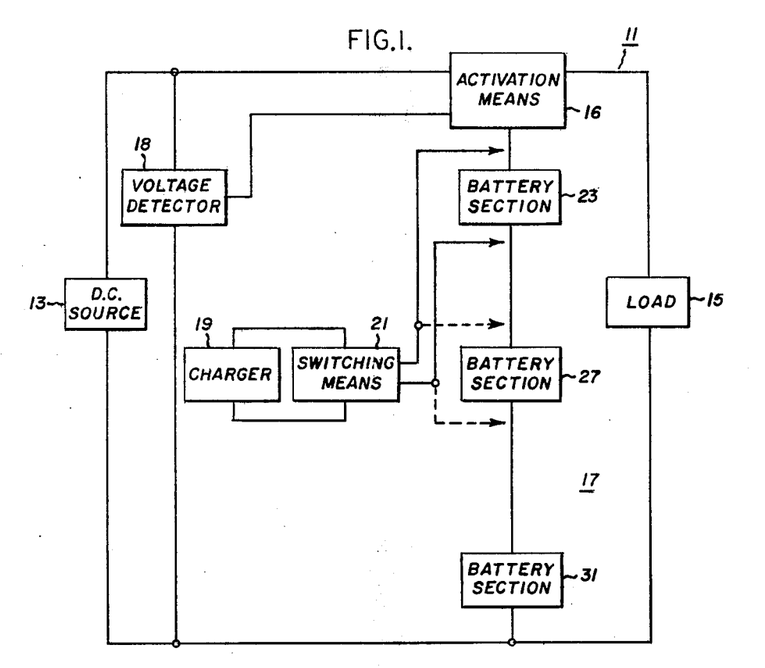
FIG. 1 is a block diagram of one embodiment of a stand-by battery power system in accordance with this invention.

In FIG. 1, a block diagram of a stand-by power system 11 constructed in accordance with the features of this invention is shown. The system 11 is normally energized by a source of DC power 13 connected in circuit with a load 15, which load requires a predetermined voltage level for operation. In the absence of the power from the source 13, power from a multicell, rechargeable nickel-cadmium battery 17, having a predetermined number of series-connection sections, here shown with three such sections 23, 27, and 31, each of at least one cell, is supplied to the load 15. The battery 17 is connectible electrically across the load 15 by the activation of a stand-by power activation means 16 that is responsive to a signal from a voltage detector 18 indicative of the non-functioning of the source 13.

As is well known in the art, a conventional secondary battery, such as those consisting of nickel-cadmium (Ni-Cd) cells, continually self-discharges from a charged condition when standing open circuit. Thus, to maintain the battery 17 at the predetermined energy level required for the operation of the load 15, a charger 19 is provided for sequentially and periodically charging each battery section 23, 27, and 31, by the operation of a switching means 21. At any point in time, the sections which are not connected to the charger 19 will decay in voltage from their charging voltage derived from its last connection to the charger 19. The operation and details of an exemplary construction of this embodiment will be described hereinbelow in connection with FIG. 3.

Figure 2:
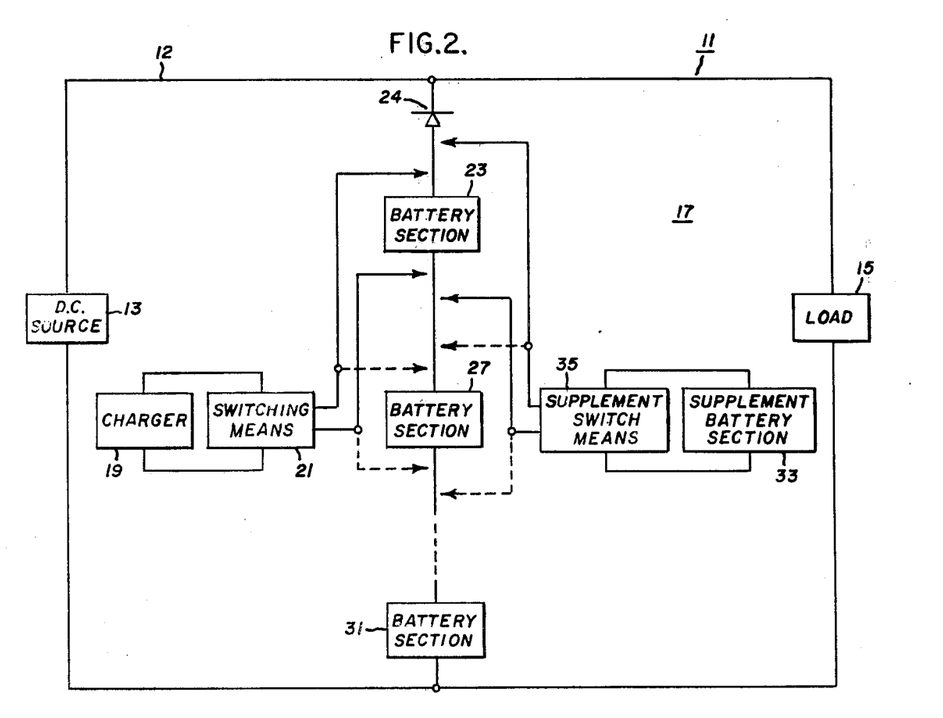
FIG. 2 is a block diagram of another embodiment of a stand-by power system in accordance with this invention.

Referring now to FIG. 2, a block diagram of another embodiment constructed in accordance with the invention herein is shown. This embodiment operates essentially the same as the embodiment of FIG. 1 except that stand-by power activation means 16 and voltage detector 18 of FIG. 1 are omitted and the terminal of battery section 23 is connected to the lead wire 12 via diode 24. This arrangement permits the battery to provide stand-by power to the load during the nonfunctioning of the DC source 13. The source 13 should have a slightly greater voltage than the peak charging voltage of the battery 17 so that under normal operating conditions the diode 24 will be reversed biased and, therefore, nonconductive. Accordingly, at any time when the voltage of source 13 falls below the voltage of battery 17, the diode 24 will be biased conductive, enabling the battery to supply power to or "pick up" the load 15. The diode 24 thus isolates the bus voltage from the battery to prevent the battery from being charged thereby. The battery charge state is then controlled only by the sequential charging of the sections by charger 19.

One of the advantages of such a configuration is that the battery may be left across the DC source so that, upon the disablement of the DC source, the stand-by power system picks up the load 15 without interruption. This is important and necessary when a load, such as a computer memory, cannot tolerate interruptions in power as might occur in the embodiment of FIG. 1 due to the finite switching time required for power activation means 16 to electrically connect the battery 17 across the load after sensing the non-functioning of the DC power source 13 via detector 18.

Another feature of this embodiment is that a supplemental battery section 33 can be coupled to various sections of the battery 17 through a supplemental switching means 35. The switching means 35 will operate in conjunction with the switching means 21 such that prior to disconnecting one of each battery sections for charging, such as section 27 shown in FIG. 2, the supplemental battery section 33 will be electrically connected in parallel with section 27 in preparation for being connected singly in series with the remaining sections upon the disconnection therefrom of section 27 for charging. This will provide an essentially constant battery voltage while one section is being removed for charging. If the battery section 27 were left in series with the remaining sections, the charging voltage applied to section 27 would raise the total battery voltage connected across the bus voltage; and to the extent that the total battery voltage exceeded the bus voltage, the battery 17 would discharge into the load. This would result in the loss of charge current from charging section 27 and would cause a discharge current through the remaining battery sections.

The charger 19 (FIGS. 1 and 2) for the individual battery sections may be of a conventional construction typically used for charging vented Ni-Cd batteries, such as Part No. 3S2060DM169A1 marketed by the General Electric Company. The preferred conventional charging system utilizes a constant current source charging at approximately the 1-hour rate (C-rate). The battery sections as charged by this system will be charged to a voltage, which automatically adjusted for temperature (FIG. 3), such as 1.48 volts per cell at 25°C. Upon attaining this voltage, the C-rate charge current is interrupted and the battery section voltage is allowed to decay at a discharge rate of approximately C/500 through a bleeder load resistor (not shown). For example, a bleeder load resistor could be continuously connected across each battery section. When the battery voltage has decayed to approximately 1.35 volts per cell at 25°C, the C-rate current is again initiated and the battery section voltage is again driven to the current cut-off as established by the temperature-compensated voltage of the cells being charged. This charging mode results in having an overchange mode of a pulsed C-rate current. The high rate charge current is preferred for Ni-Cd batteries because the positive plate has poor charge acceptance at low charge current levels but has significantly improved charge acceptance at the C-rate level of current. Thus, the pulsed C-rate overcharge permits the positive plate to be charged at a near optimum charge rate during restoration of the capacity previously discharged and also enables the minimization of electrolyte loss, which loss is directly proportionate to the integral of the overcharge current diminished by the self-discharge current.

The battery 17 (FIGS. 1 and 2) in the preferred Ni-Cd embodiments can be made of approximately 200 cells, which could be divided into battery charging sections of approximately 20 cells each. Thus, Ni-Cd battery sections would be approximately 24 volts each on discharge. It is desirable, in accordance with the preferred embodiments, for convenience in handling, safety, and to enable charging with a low voltage power source, that the battery sections be less than 30 volts. The battery sections are of a conventional construction, such as General Electric Company's rechargeable vented 13Ah Ni-Cd cells, Cat. No. 43B011AC02. The specific constructions of the cells do not form a part of the invention herein.

Figure 3:
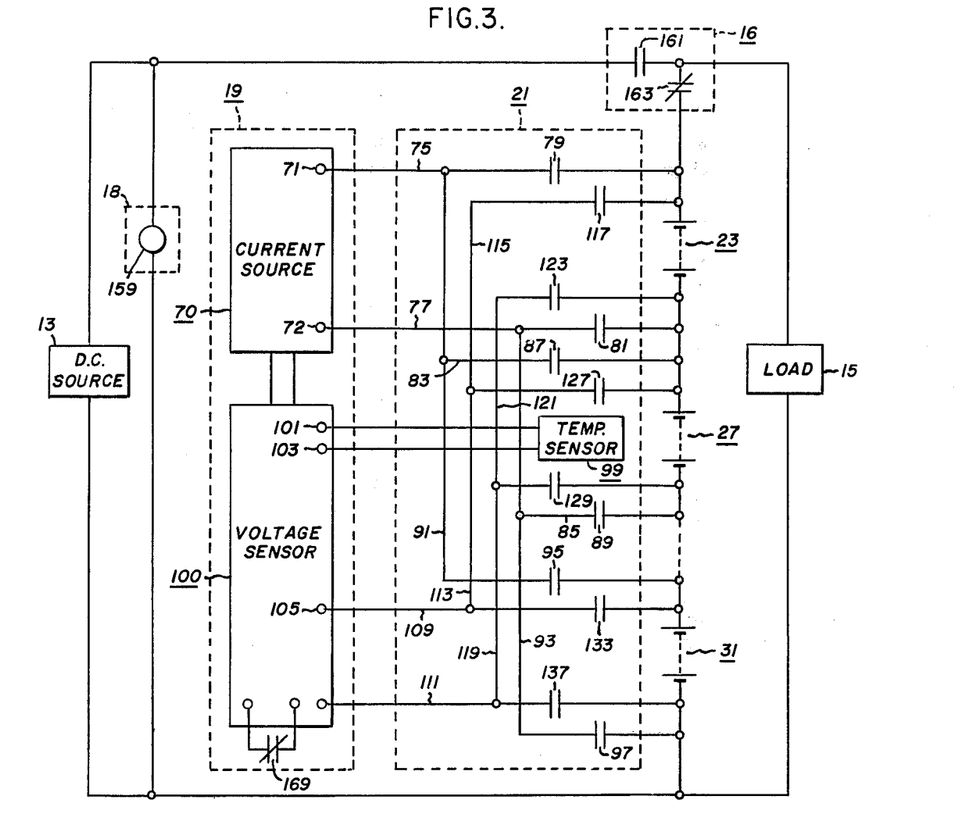
FIG. 3 is a schematic diagram, with parts omitted, of a detailed embodiment of a stand-by battery power system constructed in accordance with the embodiment of FIG. 1.

Referring now to FIG. 3, a detailed schematic diagram of charger 19, activation means 16, and switching means 21 in accordance with the embodiment of FIG. 1 is shown. The charger 19 is connected across the representative battery sections 23, 27, 31 through switching means 21 which comprises, in this embodiment, a plurality of relays (current control means), each having two pairs of relay contacts associated with each battery section, thereby to enable periodic, sequential electrical connection of the charger 19 thereto. For clarity, only the relay contacts have been shown in FIG. 3, the relay coils corresponding thereto being shown in FIG. 4.

As has been stated hereinbefore, the charger 19 is preferably a conventional high-rate, constant-current charger having a temperature-compensated voltage cut-off. In accordance with well known principles in the art, the voltage cut-off will discontinue the charge current being supplied to the battery section being charger after that section reaches a temperature-compensated voltage indicative of a substantially fully-charged state. Additionally, the charger 19 may be deactivated by closing a normally closed relay contact 169 which is controlled by relay coil 170 (FIG. 4) as will be explained hereinbelow.

The charger has a constant current source 70 having a pair of terminals 71 and 73 coupled across battery section 23 through relay contacts 79 and 81 via lead wires 75 and 77, respectively. Similarly, the current source terminals 71 and 73 are coupled across battery section 27 through relay contacts 87 and 89, respectively, via lead wires 83 and 85, respectively, which lead wires are respectively coupled to lead wires 75 and 77. Likewise, current source terminals 71 and 73 are coupled across the last of a predetermined number of battery sections 31 through relay contacts 95 and 97 via lead wires 91 and 93, respectively, which lead wires 91 and 93 are respectively coupled to lead wires 83 and 85.

The charger voltage cut-off is provided by a voltage sensor 100 coupled by a pair of relay contacts across each battery section 23, 27 and 31 in a manner similar to that of the current source. The electrical connection of the voltage sensor 100 to each battery section, as will be explained more fully hereinbelow, is coordinated with that of the current source 70 so that the voltage sensor and, therefore, the charger will be responsive to the voltage of the battery section being charged via the current source.

In particular, a first voltage sensor input terminal 105 is coupled to one side of battery section 23 through relay contact 117 via lead wires 109, 113, and 115. The other voltage input terminal 107 is coupled to the other side of battery section 23 through relay contact 123 via lead wires 111, 119, and 121.

Similarly, the first voltage sensor contact is coupled to a first side of the battery section 27 through relay contact 127, via lead wires 109 and 113. Voltage sensor terminal 107 is coupled to the other side of battery section 27 through a relay contact 129 via lead wires 111 and 119.

Lastly, the first voltage sensor terminal 105 is coupled to a first side of the battery section 31 through relay 133 via lead 109. Voltage sensor terminal 107 is connected to the other side of battery section 31 through a relay contact 137 via lead wire 111.

As has been stated, the battery charger cut-off is temperature-compensated. This is so because, as is well known, the battery voltage indicative of a fully-charged state is a function of temperature. Thus, a temperature sensor 99 provides an input to the voltage sensor 100 for adjusting the voltage indicative of a fully-charged state of the battery section being charged in accordance with principles well known in the art. The sensor 99, which may be of any conventional construction, is electrically connected to the battery charger 19 at terminals 101 and 103. The temperature sensor 99 should be positioned centrally of the battery sections so that it will be responsive to a temperature which would most nearly approximate the average temperature of the battery system as a whole.

The functions of the voltage detector 18 and activation 16 can be provided by a conventional undervoltage relay having a relay coil 159 and two pairs of relay contacts 161, 163. As will be apparent from FIG. 3, during normal operation of source 13, normally open contacts 161 will be in a closed position to supply power to the load 15, while the normally closed contacts 163 will be in an open position; and when the voltage of source 13 falls below the predetermined operating voltage required for load 15, contacts 161 will be opened and contacts 163 will be closed to connect the battery 17 across the load 15, thereby to provide stand-by power to the load 15.

Figure 4:
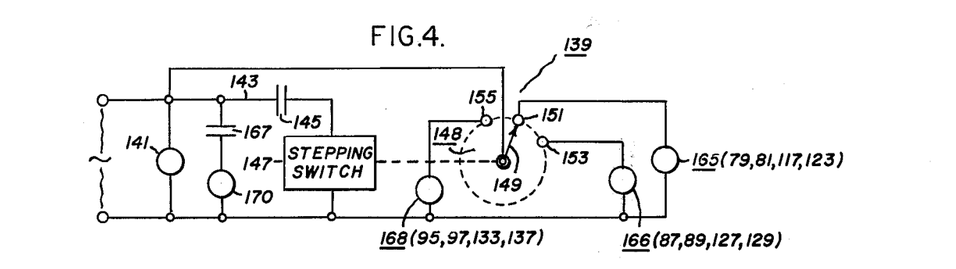
FIG. 4 is a schematic diagram of a time sequence control circuit for use in the diagram of FIG. 3.

Referring now to FIG. 4, a timing control circuit 139, which is an additional portion of switching means 35, is shown for coordinating the operation of charger 19 and the plurality of relay contacts as shown in FIG. 3 so as to provide periodic, sequential charging of the respective battery sections 23, 27, and 31.

The control of the sequential charging of the battery sections 23, 27, and 31 is provided by a conventional timer motor 141, which controls a plurality of relays consisting of relay coils 165, 167, 168 and the corresponding groups of relay contacts 79, 81, 117, 123; 87, 89, 127, 129; and 95, 97, 133, 137, respectively, which groups in turn correspond to, respectively, the battery sections 23, 27, 31 via a timer-operated, stepping switch input contact 145 and a stepping switch 147.

Stepping switch 147 sequentially activates relay coil 165, 167, 168 via a plurality of stepping switch terminals 151, 153, 155 connected, respectively, thereto by the stepping of a contact arm 149 between the terminals 151, 153, 155. These relay coils 165, 166, 168 actuate the respective groups of relay contacts 79, 81, 117, 123; 87, 89, 127, 129; and 95, 97, 133, 137. All of the relay contacts within a group are concurrently opened and closed to provide for the simultaneous connection of the current source 70 and voltage sensor 100 to each of corresponding battery sections, one at a time.

A timer-operated, charge-current-control contact 167, which is series connected to the relay coil 170 for operating relay contact 169 (FIG. 3), coordinates the energization of the current source 70 with the activation of the stepping switch 147 by relay contact 145. As will be apparent from the discussion of FIG. 5 hereinbelow, the charger will be deenergized during the opening of the pair of charge current source relay contacts and the pair of voltage sensor relay contacts associated with the battery section being charged and the closing of the two pairs of relay contacts associated with the battery section next in sequence.

The normal operation of an embodiment of a charger system, i.e., when power is being supplied from DC source 13 to the load 15 (FIG. 1) constructed in accordance with FIGS. 1, 3, and 4 will be discussed in regard to the FIG. 5 graph of the relative operational time sequence of the charge-current-control contact 167 and the stepping-switch, input contact 145. As indicated by the legends of the graph in FIG. 5, the upper line 172 represents the opening and closing of contact 167, and the lower line 174 represents the opening and closing of contact 145 responsive to the timer 141.

Figure 5:
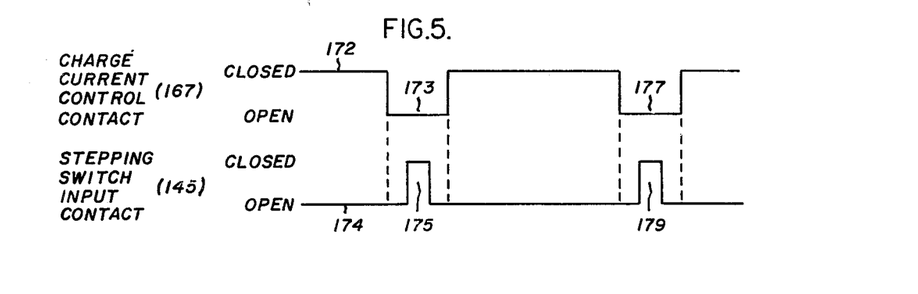
FIG. 5 is a graphical representation of the operational time sequence of certain switching elements of FIG. 4.

At the beginning of the sequence shown in FIG. 5, the charge-current-control contact 167 is closed, and the stepping switch contact 145 and relay contact 169 are open. Assume, for example, in FIGS. 3 and 4 that contact 167 is closed; contact 169 is open; arm 149 is connected to terminal 151; the pairs of contacts 79, 81, and 117, 123 corresponding to battery section 23 are closed. Accordingly, during this condition, battery section 23 is being charged in accordance with the method discussed hereinbefore. During an interval 173 along the upper line graph 172 of FIG. 5, the contact 167 will be opened, and 169 will be closed via the deactivation of relay coil 170 to deactivate the charger current source 70, thus terminating the charging of battery section 23. Following the initiation of the time interval 173, the contact 145 will be changed from the open position to the closed position for an interval 175 to activate the stepping switch 147, which in turn steps contact arm 149 from terminal 151 to the next terminal in sequence (153), opening the pairs of contacts 79, 81, 117, 123. Upon the connection of contact arm 149 to terminal 153, the two pairs of relay contacts 87, 89 and 127, 129, respectively, corresponding to battery section 27 are closed to permit charging of section 27 upon reactivation of the charger. Following the stepping of contact arm 149 to the next contact 153 in sequence and the terminating of interval 175 with the opening of contact 145, the interval 173 will be terminated with the closing of contacts 167 and the opening of contact 169 via the activation of relay coil 170 to reactivate the charger current source 70. Accordingly, battery section 27 will now be charged in accordance with the method discussed hereinbefore. As can be seen, the beginning of interval of time 173 and the beginning of the next interval 177 will be separated by some time period, e.g., 5 minutes. However, the magnitude of the switching time intervals 173, 175, 177, 179 as shown in FIG. 5 are intended to be only illustrative of the sequence of operation because, in actuality, they can be made to be substantially instantaneous, using conventional circuit elements.

The next sequence of operations for the stepping of contact arm 149 from terminal contact 153 to 155, in accordance with the intervals 177 and 179 of FIG. 5, is analogous to the foregoing description.

As will be apparent, the circuit design does not provide for terminating the charger 19 after one complete sequence of the charing operation for the battery sections. Thus, during the continuation of normal operation DC source 13, the battery sections will be periodically charged in sequence so as to continually maintain the preferred charged state of the battery 17 indefinitely.

Figure 6:
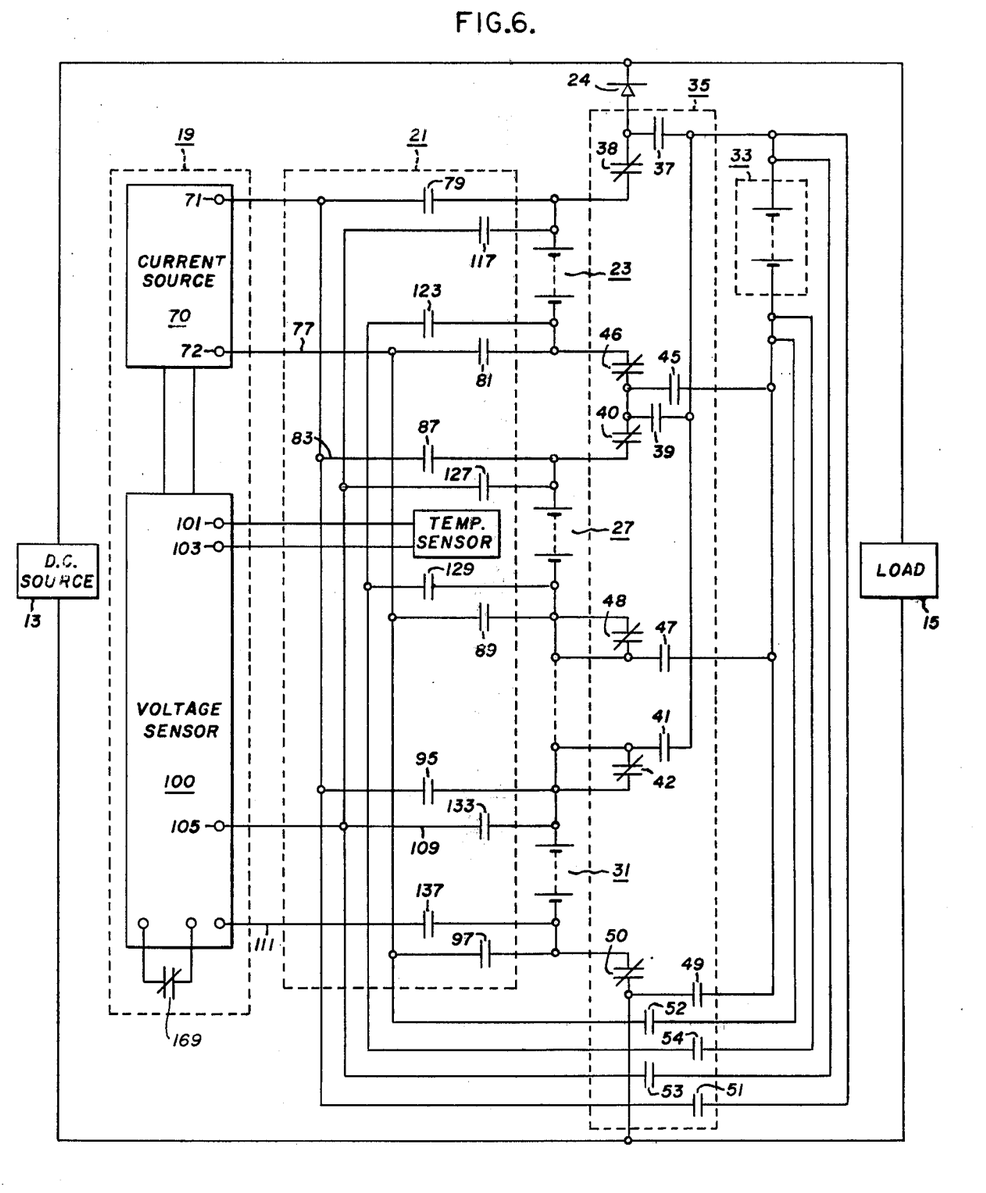
FIG. 6 is a schematic diagram of a detailed embodiment, with parts omitted, of a stand-by power system constructed in accordance with the embodiment of FIG. 2.

Referring now to FIG. 6, a detailed circuit diagram of the charger 19, switching means 21, and supplemental switching means 35 in accordance with the embodiment of FIG. 2 is shown. (Circuit elements of FIG. 6 analogous to those of FIG. 3 are indentically numbered).

The current source 70 and voltage sensor 100 are selectively electrically connected to each battery section 23, 27, 31 for charging via two pairs of relay contacts as specified hereinbefore in regard to FIG. 3.

The supplemental battery section 33 is electrically connected to each battery section 23, 27, 31 via supplemental switching means 35, which comprises a plurality of relays. Again for clarity, only the relay contacts have been shown in FIG. 6, the relay coils corresponding thereto being shown and described in regard to FIG. 7.

Respective pairs of relay contacts 37, 38; 39, 40; 41, 42 connect the positive terminal of the supplemental battery section 33 to the positive terminals of battery sections 23, 27, 31 and respective pairs of relay contacts 45, 46; 47, 48; 49, 50 connect the negative terminal of the supplemental battery section 33 to the negative terminals of the battery sections 23, 27, 31. These relay contacts provide first for the sequential switching of the supplemental section 33 into parallel with a battery section to be charged and second for the subsequent removal of the latter section from the series connected sections prior to the connections of the latter section to the charger. The supplemental battery section 33 is also electrically connected to the charger in the sequencing process so that the charge level thereof is maintained, the current source 70 being connected via relay contacts 51, 52 and the voltage sensor 100 being connected via relay contacts 53, 54.

Figure 7:
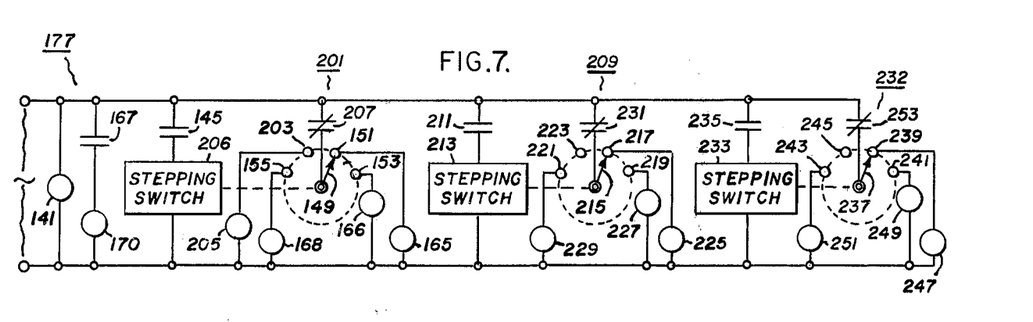
FIG. 7 is a schematic diagram of a time sequence control circuit for use in the diagram of FIG. 6.

Referring now to FIG. 7, a timing control circuit 177 is shown for coordinating the periodic, sequential charging of the battery sections 23, 27, 31 while substituting the supplemental battery section for each battery section 23, 27, 31, in turn, as each is coupled to the charger 19.

The control circuit 177 is comprised of three control sections 201, 209, 232, the section 201 being part of switch means 21, while sections 209, 232 are part of the supplemental switching means 35. The first control section 201 is the same as that shown for FIG. 4 with the exception that an additional terminal 203 is provided for connecting supplemental battery section 33 to the charger via the operation of relay contacts 51, 52, 53, 54, responsive to a relay coil 205. Additionally, a normally closed timer-operated contact 207 is provided for controlling the voltage input to the relay coils 165, 166, 168 after each activation of the stepping switch 206 in coordination the second and third control section 209, 232, as will be explained hereinbelow in regard to FIG. 8. The other elements of the first section 201 are enumerated as in FIG. 5.

The second control section 209 comprises a stepping-switch, control contact 211 for operating a stepping switch 213 responsive to the operation of the timer 141. The stepping switch 213 steps contact arm 215 between terminals 217, 219, 221, and 223, the terminals 217, 219, 221 being connected to, respectively, relay coils 225, 227, 229, and terminal 223 being an open terminal. The terminal 223 is open because the contact arms 149 and 215 are stepped an equal number of steps; and when arm 149 contacts terminal 203 to charge supplemental battery section 33, arm 215 will contact open terminal 223 so that no control function of control section 209 will be initiated. This is because the battery sections 23, 27, 31 remain in series connection during this period when section 33 is being charged.

The relay coils 225, 227, 229 operate the respective pairs of relay contact 38, 46; 40, 48; 42, 50. As will be apparent from the discussion in regard to FIG. 8, the stepping of the contact arm 215 between the terminals 217, 219, and 221 will provide for the opening and closing of these contacts, which will disconnect the battery section to be charged from the remaining series-connected battery sections and will replace the section to be charged with the supplemental section 33. A timer-operated contact 231 is provided for controlling the voltage input to relay coils 225, 227, 229 after each actuation of the stepping switch 213 of second control section 209 in coordination with the first and third sections of the control circuit 177 as will be explained hereinbelow in regard to FIG. 8.

The third control section 232 of the control circuit 177 comprises a stepping switch 233 and a stepping switch control contact 235 for operating the stepping switch 233 responsive to timer 141. The stepping switch 233 is operatively coupled to contact arm 237 for stepping it between a plurality of terminals 239, 241, 243, and 245. The terminals 239, 241, 243 are respectively connected to relay coils 247, 249, 251, which in turn control the position of the respective pairs of relay contacts 37, 45; 39, 47; 41, 49. Terminal 245 is an open terminals, corresponding to terminal 203, 223, to which the contact arm 237 is indexed when the supplemental battery section 33 is being charged. A timer-operated contact 253 is provided for controlling the voltage input to the relay coils 247, 249, 251 after each actuation of the stepping switch 233 of the third control section 232 in conjunction with the closure of contact 207 of first control section 201 and the closure of contact 231 of second control section 209.

As will be apparent from the discussion of FIG. 8 hereinbelow, each pair of contacts 37, 45; 39, 47; 41, 49 associated, respectively, with battery sections 23, 27, 31 operate, when closed, to allow the supplemental battery section 33 to first be connected in parallel with a section to be charged and second to allow the supplemental section 33 to be series-connected to the remaining battery sections when one of the respective pairs of contacts 38, 46; 40, 48; 42, 50 is opened by the second control section 209.

Figure 8:
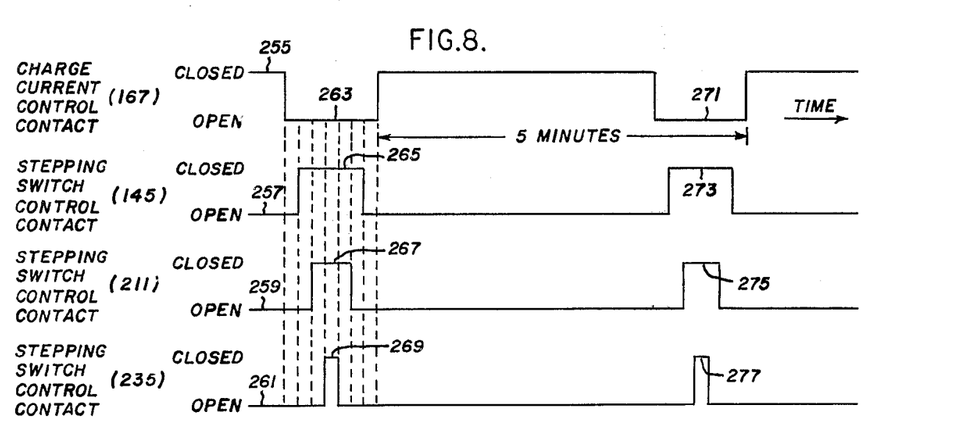
FIG. 8 is a graphical representation of the operational time sequence of certain switching elements of FIG. 7.

Referring now to FIG. 8, a graph of the relative operational time sequence of the respective contacts of the first, second and third control sections 201, 209, and 232 of control circuit 177 constructed in accordance with FIGS. 2, 7, and 8 is shown. As indicated in the legend on the graph, the first line graph 255 represents the position of the contact 167; the second line graph 257 represents the position of the contact 145; the third line graph 259 represents the position of the contact 211; and the fourth line graph 261 represents the position of contact 235. Contact 167 controls the operation of charge current source 70 through relay coil 170 (FIG. 7) and contact 169 (FIG. 6) while contacts 145, 211, and 235 control the operation of the stepping switches 206, 213, and 233, respectively.

In operation, and assuming that charging period for battery section 23 has just been completed, switch sequence starts with the contacts 79, 81, 117, and 123 for battery section 23 in the closed position; the contact 169 in the open position; the contacts 37 and 45 in the closed position; and the contacts 38 and 46 in the open position.

Starting at the left side of FIG. 8 with line graph 255, first the relay coil 170 is actuated by the opening of contacts 167 for a time interval 263 responsive to the timer 141 to close the relay contact 169 to terminate the operation of the charger 19.

Second (line graph 257), after a short time interval, the timer contact 145 is shifted from the open to the closed position for an interval of time 265 responsive to the operation of the timer 141. The closing of contact 145 provides a voltage input to the stepping switch 208 to step the contact arm 149 from terminal 151 to terminal 153. The shifting of the contact arm from terminal 151 provides for the opening of relay contacts 79, 81, 117, 122 which disconnects the charger 19 from battery section 23. Contact 207, which operates in conjunction with contact 145, is switched from the closed position to the open position at the beginning of time interval 265. Contact 207 remains open for the time interval 265 so that no voltage will be supplied to the relay coil 168 until the termination of time interval 265 denoted by the opening of contact 145 and the closing of contact 207.

Third (line graph 259), the timer contact 211 is shifted from the open position to the closed position for a time interval 267 to provide a voltage input to the stepping switch 213 to shift the contact arm 215 from terminal 217 to terminal 219. The shifting of contact arm 215 from terminal 217 closes relay contacts 28, 46, which reconnects the battery section 23 and the supplemental section 33 in parallel. The timer contact 231 operates in conjunction with the relay contact 211 and is thus shifted from the closed to the open position at the beginning of time interval 267 to prevent a voltage input from being applied to relay coil 227 until the end of time interval 267 denoted by the closing of contact 231 and the opening of contact 211.

Fourth (line graph 261), the contact 235 is switched from the open to the closed position for a time interval 269 to actuate the stepping switch 233 to provide for the shifting of contact arm 237 from terminal 239 to terminal 241. The shifting of the contact arm 237 from the terminal 239 causes the relay contacts 37 and 45 to open, which disconnects the parallel connection of supplemental battery section 33 to battery section 23, leaving only section 23 in series with battery sections 27, 31. Timer contact 253 operates in conjunction with timer contact 235 and is opened at the beginning of time interval 269 and remains open until the end of time interval 269. Upon closing, timer contact 253 provides a voltage input to the relay coil 249 through terminal 241, which causes relay contacts 39 and 47 to be closed. With the closing of contacts 39, 47, the supplemental battery section 33 is connected in parallel with the next battery section (i.e., section 27) in sequence after section 23.

Fifth (line graph 259), the timer contact 231 is closed to provide a voltage input to relay 227 to provide for the opening of relay contacts 40 and 48 which disconnects the battery section 27 from battery sections 23, 31, 33 and retains the supplemental battery section 33 in series with battery sections 23 and 31. Also, timer contact 211 is switched to its open position at the termination of time interval 267 and will remain so until the next stepping sequence.

Sixth (line graph 257), timer contact 207 is closed at the termination of time interval 265 which provides a voltage input to relay coil 167 to close relay contacts 87, 89, 127, 129. The closing of relay contacts 87, 89, 127, 129 represents the coupling of battery section 27 to charger 19 as described hereinbefore. Also in conjunction with the closing of contact 207, the timer contact 145 returns to its open position at the end of interval 265 where it will remain until the next stepping sequence.

Seventh (line graph 255), the relay contact 167 returns to its closed position to provide a voltage input to relay coil 170 which returns its relay contact 169 to the open position. The returning of the relay contact 169 to the open position provides for the activation of the charger 19. In summary then, battery section 23 is now series-connected to supplemental battery section 33 and battery section 31, and battery section 27 is connected to the charger 19 for charging during the predetermined interval of time.

As will be apparent, the next stepping sequence will occur with the time interval 271 of line graph 255 and progress through the time intervals 273, 275, 277 of line graphs 257, 259, 261, respectively, in an analogous manner to the switching sequence described hereinbefore. The only difference is that now the battery section 27 is placed back in series-connection with battery section 23 and supplemental battery section 33, which is now used to replace battery section 31 while it is connected to the charger 19 for the predetermined interval of time. After the switching sequence has gone through an predetermined number of stepping sequences determined by the number of battery sections to be charged, the contact arms 149, 215, and 237 of the control circuit 177 will reach the terminal positions 203, 223, and 245, respectively. The positioning of contact arm 149 on terminal 203 will provide a voltage input to relay coil 205 (FIG. 7) which will close relay contacts 51, 52, 53, 54. This will connect supplemental battery section 33 to charger 19 while the battery sections 23, 27, and 31 are connected in series to provide a stand-by voltage not much less than the voltage of DC source 13. As has been stated, terminals 223, 245 are open because no switching is required by control sections 209, 232 when supplemental battery section 33 is coupled to the charger and battery sections 23, 27, 31 are series-connected across bus 13.

After the supplemental battery section 33 has been charged, the stepping sequence will begin over again with the charging of battery section 23 in the same manner as discussed hereinbefore.

One of the primary features of this invention is to provide, as nearly as possible, a stand-by battery voltage approximately equal to the bus voltage and to minimize the voltage variation applied to the load upon and after transition to the stand-by supply. It will be clear that, in the embodiment of FIG. 2 wherein the battery is floated across the bus, the bus voltage must be in reality a little greater than the stand-by battery open circuit voltage, but the object is to make them as nearly equal as possible in the embodiments of both FIGS. 1 and 2. The charging scheme of this invention provides for all of the battery sections, except the one which is applied at any instant to the charger, to be decaying in voltage to its open-circuit voltage from the charging voltage; and optionally, with a pulsed charger 19 as explained hereinbefore, even the section being charged could be caused to decay in voltage somewhat through a bleeder load resistor (load resistance means) (not shown) before being reconnected into the supply.

Figure 9:
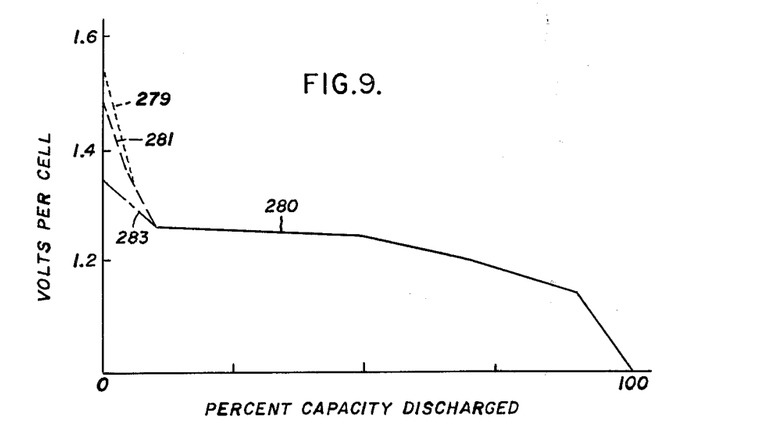
FIG. 9 is a graph of characteristic curves for the discharge voltage per cell versus the percent capacity discharged per cell of batteries charged by conventional methods and of batteries charged in accordance with this invention.

Referring now to FIG. 9, this feature can be better understood by considering a graph of the discharge voltage per cell of a vented nickel-cadmium battery as a function of the percent capacity discharged for cells charged by various charging schemes. A dotted line 279 represents the discharge curve of a plurality of cells after a C/10 constant current overcharge which gives them an end of charge voltage of approximately 1.55 volts per cell. As can be seen, the discharge curve will drop to a voltage plateau region 280 starting at approximately 1.25 volts per cell and about 10% capacity discharged and ending at 1.15 volts and 90% capacity discharged. This central portion of the curve is the region having the smallest voltage variation per unit discharge time. Accordingly, this region is the most desirable operating region for stand-by Ni-Cd battery power supplies. A dotted line 281 represents a multicell battery charged by a constant potential float charge at a voltage of approximately 1.50 volts per cell. Its discharge curve is substantially analogous to that of the C/10 constant current overcharged battery in that it falls from an initial charging voltage of approximately 1.50 volts into the plateau region of the curve at approximately 1.25 volts per cell and 10% capacity discharged. In contrast, a dot-dash line 283 represents the discharge curve of a battery charged in accordance with the invention herein wherein the voltages of all battery sections are in various stages of exponential decay — with the possible exception that the battery section on charge at any particular time may not be decaying in voltage because it is receiving charge current — between the end of charge voltage of 1.48 volts per cell and a voltage of approximately 1.35 volts per cell. This yields an initial average composite stand-by battery voltage per cell available to the load of between 1.36 volts and 1.38 volts as, for example, in a 200-cell battery of 10 battery sections of 20 cells each using a total sequencing cycle, e.g., of one hour. The stand-by battery voltage is heavily weighted toward the 1.35 volt value because (1) the most rapid voltage decay occurs at values above 1.35 volts, and (2) the battery sections not on charge will not decay substantially lower than 1.35 volts per cell during the periods when they are not applied to the charger for recharging.

Thus, the stand-by battery voltage which would be applied to the load at any instant will be based primarily on a voltage per cell approximately equal to the 1.35 volts (lower limit for charge current initiation) — or even lower than the open circuit voltage if decay is enhanced by small bleeder load resistors across each battery section, respectively — rather than the higher, per cell, charger voltage which would result from the simultaneous charging of all battery sections.

It can be seen that the periodic sequential charge of a stand-by battery in sections as disclosed by this invention would yield a significantly reduced voltage variation, when connected to the load, by allowing the majority of the sections to be decaying while one section is on charge. This diminishes many of the problems experienced in the prior art such as the provision of expensive and complex regulating equipment to protect the load from the voltage variations which they would be exposed to when using conventional stand-by power systems. As can be seen, the voltage variation inherent in conventional systems is approximately 0.50 volts per cell over the effective capacity of a stand-by supply whereas a battery charged in accordance with the invention herein has an inherent voltage variation of approximately 0.36 volts per cell over the effective capacity of a stand-by supply. More significant, though, is the fact that conventional systems may experience an initial drop of approximately 0.25 volts per cell between full charge and 10% capacity discharged in contrast with the supply of this invention which would experience an initial drop of approximately 0.11 volts over approximately the same discharge time to reach the 1.25 volt plateau region of FIG. 9.

Another significant factor in explaining the reduction of the voltage variation accomplished by this invention is that the desired stand-by voltage required to match the bus voltage may be based on a larger number of cells due to the fact that the majority of the cells are maintained at a lower voltage of approximately 1.35 volts compared to at least 1.50 volts per cell for conventional systems. Accordingly, the load will be supplied at a higher voltage level because the battery can contain a larger number of cells and which for constant power loads will increase the discharge time for the supply as a whole. More significantly, this will decrease the discharge voltage variation per unit time because the supply can operate primarily, or at least for a longer period of time, within the plateau region of FIG. 9.

This invention has only been shown and described with respect to three battery sections. However, as will be apparent to those skilled in the art, the sequencing arrangement can obviously be constructed for any number of battery sections, and likewise the cycle period for the timer 141 may be adjusted to provide an appropriate charging period for each respective section. A typical example would be the use of 10 battery sections with the timer having a period of 2 minutes. Thus, the charger would be applied for 2-minute intervals, excluding switching time intervals, to each respective battery section, thereby to pass through a sequencing scheme in 20 minutes.

Further, it will be apparent to those skilled in the art that equivalent switching means, using solid state devices such as SCR's and transistors or other equivalent switching apparatus well known in the art, may be substituted for the relays shown in FIGS. 3 and 7 as one example of the switching means 21 and 35.

Additionally, the invention herein can be utilized with battery types other than Ni-Cd, such as a lead-acid battery.

Thus, while the invention has been shown and described with respect to specific embodiments thereof, it is not intended to be limited to the particular forms shown and described. Accordingly, the appended claims are intended to cover all modifications within the spirit and scope of the invention herein described.

What I claim as new and desire to secure by Letters Patent of the United States is:

1. A battery charging apparatus for a high voltage stand-by power system, said system comprising a power source connected in circuit with a load and a battery of rechargeable cells coupled across said load to provide stand-by power upon the non-functioning of said source, said battery being divisible into a plurality of sections of at least one cell each for charging, and a supplemental battery section, said apparatus comprising:
   a. charging means for supplying a source of charging current;
   b. switching means, coupled between said charging means and each of said plurality of sections, for sequentially switching said plurality of sections, one section at a time, to said charging means for charging, said switching means comprising:
      1. a plurality of circuit paths for electrically connecting said charging means in circuit with each of said sections;
      2. current control means in said circuit paths for controlling the transmission of current from said charger to each of said sections; and
      3. first control section means for activating said current control means to sequentially transmit said current to said sections, one at a time; and
   c. a supplemental switching means, coupled between said supplemental battery section and said battery, for automatically, electrically connecting said supplemental battery section in circuit with said battery when one of said sections is being charged, said supplemental switching means comprising:
      1. a plurality of supplemental circuit paths for connecting said supplemental section to each of said battery sections;
      2. supplemental current control means in said supplemental circuit paths for controlling the conductivity of said circuit paths;
      3. second control section means for activating said supplemental current control means to sequentially connect said supplemental section in parallel with each of said battery sections, one section at a time; and
      4. third control section means for activating said supplemental current control means to disconnect each of said sections from said battery and from said supplemental section.

2. The charging apparatus of claim 1 wherein said switching means is operable to automatically perform said sequential connection of said sections to said charger by:
   a. disconnecting one of said sections from said plurality of sections;
   b. connecting said one section in circuit with said charging means;
   c. disconnecting said one section from said charger after charging;
   d. reconnecting said one section in circuit with said plurality of sections.

3. The apparatus of claim 1 further comprising load resistance means for causing each said plurality of sections to slowly decay in voltage after charging.

4. The charging apparatus of claim 1 wherein said switching means comprises a timing means for sequencing the operation of said second and third section means with said first section means for the charging of each battery section such that, in order, (1) the second section means activates said supplemental current control means to connect said supplemental section in parallel with one of said sections, (2) the third section means activates said supplemental current control means to disconnect said one section from said battery and from said supplemental section, (3) the first section means activates said current control means to transmit said current to said one section, (4) the first section means deactivates said current control means to terminate said current transmission (5) the second section means deactivates said supplemental current control means to reconnect said one section in said battery in parallel with said supplemental section, and (6) the third section means deactivates the supplemental contact means to disconnect said supplemental section from said one section.

5. The apparatus of claim 1 further comprising:
   activation means, coupled between said battery and said source, for electrically connecting said battery to said load responsive to the non-functioning of said source, said activation means further comprising first means in the circuit path between said source and said battery for controlling the conductivity thereof, and second means in the circuit path between said battery and said load for controlling the conductivity thereof; and
   detector means connected to said source and said activation means for sensing the decrease of the voltage from said source below a predetermined level, for activating said first means to prevent transmission of battery current from the battery to the source, and for activating said second means to permit the transmission of battery current from said battery to said load.

6. The apparatus of claim 1 wherein said charging means comprises means for supplying pulsed charge current.

7. A stand-by power system for a load normally powered by a power source connected in circuit with said load comprising:
   a. a battery comprising a plurality of cells coupled across said load to provide stand-by power upon the non-functioning of said source, said battery being divisible into a plurality of sections of at least one cell each for charging;
   b. charging means for supplying charge current;
   c. switching means, coupled between said charging means and each of said plurality of sections for sequentially connecting said plurality of sections, one section at a time, to said charging means for charging, said switching means comprising:
      1. a plurality of circuit paths for electrically connecting said charging means in circuit with each of said sections;
      2. current control means in said circuit paths for controlling the transmission of current from said charger to each of said sections; and
      3. first control section means for activating said current control means to sequentially transmit said current to said sections, one at a time;
   d. a supplemental battery section; and
   e. a supplemental switching means, coupling said battery and supplemental battery section, for automatically electrically connecting said supplemental section in circuit with battery when one of the sections of said battery is being charged by said charging means, said supplemental switching means comprising:
      1. a plurality of supplemental circuit paths for connecting said supplemental section to each of said battery sections;
      2. supplemental current control means in said supplemental circuit paths for controlling the conductivity of said circuit paths;
      3. second control section means comprising a first means for activating said supplemental current control means to sequentially connect said supplemental section in parallel with each of said battery sections, one section at a time; and
      4. third control section means for activating said supplemental current control means to disconnect each of said sections from said battery and from said supplemental section.

8. The system of claim 7 further comprising load resistance means for causing each of said plurality of sections to slowly decay in voltage after charging.

9. The system of claim 7 wherein said switching means comprises a timing means for sequencing the operation of said second section means and third section means with said control means for the charging of each battery section such that, in order, (1) the second section means activates said supplmental current control means to connect said supplemental section in parallel with one of said battery sections, (2) the third section means activates said supplemental current control means to disconnect said one battery section from said battery and from said supplemental section, (3) the first section means activates said current control means to transmit said current to said one battery section, (4) the first section means deactivates said current control means to terminate said current transmission, (5) the second section means deactivates said supplemental current control means to reconnect said one section in said battery in parallel with said supplemental section, and (6) the third section means deactivates the supplemental contact means to disconnect said supplemental section from said one section.

10. The system of claim 7 wherein said charging means comprises means for supplying pulsed charge current.

11. The system of claim 7 further comprising:
   activation means, coupled between said battery and said source, for electrically connecting said battery to said load responsive to the non-functioning of said source, said activation means further comprising first means in the circuit path between said source and said battery for controlling the conductivity thereof, and second means in the circuit path between said battery and said load for controlling the conductivity thereof; and
   detector means connected to said source and said activation means for sensing the decrease of the voltage from said source below a predetermined level, for activating said first means to prevent transmission of battery current from the battery to the source and for activating said second means to permit the transmission of battery current from said battery to said load.

* * * * *